United States Patent [19]
Martini et al.

[11] Patent Number: 5,777,333
[45] Date of Patent: Jul. 7, 1998

[54] ASYMMETRIC RADIATION DETECTOR SYSTEM

[75] Inventors: Mario Pierangelo Martini; Dale A. Gedcke; Thomas W. Raudorf, all of Oak Ridge; Pat Sangsingkeow, Knoxville, all of Tenn.

[73] Assignee: EG&G Instruments, Inc., Oak Ridge, Tenn.

[21] Appl. No.: 824,514

[22] Filed: Mar. 26, 1997

[51] Int. Cl.$^6$ .................................................. G01N 23/04
[52] U.S. Cl. .............................. 250/370.01; 250/370.01
[58] Field of Search .......................... 250/370.1, 370.01

*Primary Examiner*—Craig E. Church
*Attorney, Agent, or Firm*—Iandiorio & Teska

[57] ABSTRACT

An radiation detection system whose inner and outer electrodes are shaped and positioned so that each path between them is a different length is a different length whereby the rise time of a pulse derived from a detected radiation event can uniquely define the azimuthal and radial position of that event.

31 Claims, 6 Drawing Sheets

Input (a)

Delayed (b)

Subtracted (a-b)

ASYMMETRIC RADIATION DETECTOR SYSTEM

FIELD OF INVENTION

This invention relates to an asymmetric radiation detection system which with unsegmented electrodes uniquely defines the azimuthal and radial position of a radiation detection event.

BACKGROUND OF INVENTION

High-purity germanium (HPGe) detectors (see G. F. Knoll, *Radiation Detectors and Measurements*, Wiley 1989, Chapters 2, 4, 11 and 12) are frequently used in energy spectroscopy and related fields to detect gamma rays or other high-energy photons. These detectors essentially consist of a large germanium diode made from germanium which is very highly purified, and lightly doped. The germanium crystal is machined in a desired shape, such as planar or coaxial. Electrodes are applied to opposing contacts of the detector, one of which is rectifying electrode formed of p+ or n+ species, depending on the doping of the bulk germanium. A reverse-bias voltage is applied to the electrodes. The voltage is sufficiently high to cause all of the volume of the germanium to be depleted (i.e., under an electric field). Gamma rays impinging upon the detector will collide with the germanium atoms, causing hole-electron carrier pairs to be created. These holes and electrons are collected by the electrodes. The total charge collected by the electrodes is related to the energy of the detected photons.

The energy resolution of these detectors as gamma ray spectrometers is extremely good. For example, for gamma rays of 1 MeV of energy, the energy resolution, measured as the full width half maximum of the gaussian peak generated by the detector-electronics system, is better than two parts per thousand. Also, these detectors are now available in very large size (cylinders of 8 cm diameter by 8 cm length) and have, therefore, a high gamma detection efficiency.

Therefore, notwithstanding the high price and the inconvenience of cooling the detectors at liquid nitrogen temperature, they are the detector of choice in nuclear structure studies. Such studies are nowadays conducted with large arrays ("Gammasphere" at LBL-USA, "Euroball" at Legnato-Italy) where 100 or more detectors are mounted in a spherical structure. Also "Miniballs" (40–60 detectors) are in a project phase. In such experiments, the target, at the center of the sphere, is bombarded with fast heavy ions. The resulting gamma rays provide the information sought by the scientists. However, the nuclei recoil while emitting gammas which causes the emitted gamma energy lines to be broadened by Doppler shift. The only way to mitigate the imprecision caused by the Doppler shift is to correct the spectra by identifying where in the detector the event takes place. This also adds the benefit of complete tracking of the gamma rays inside the detector, thus distinguishing between multiple interactions of a single hit and multiple hits (see *Nuclear Instruments and Methods in Physics Research* A371 (1996), 489–496).

One modification proposed and tried for obtaining position information is "segmentation", i.e., dividing the outer and/or the inner contact in two or more conducting surfaces electrically insulated from each other by thin separation lines. For example, 60 of the 110 detectors in the Gammasphere are twofold segmented, i.e., the outer contact of the detector is divided in two electrically insulated halves. Signals are obtained both from the central contact (total energy) and the side contacts (position). In order to further improve position resolution, multiple segmentation (for example, the LBL "GRETA" project with 32 segments) is being proposed.

It should be noted that, while segmentation certainly works, it adds a large cost to the system because it is more difficult to make a segmented detector and also, every segmented channel needs a complete line of electronics. Moreover, segmented detectors are intrinsically less reliable.

It is well known that gamma rays interact with Ge in a complex way, often resulting in multiple interactions.

This would seem to make pulse shape analysis difficult or even impossible. However, in practice, three factors intervene which vastly improve the viability of pulse shape analysis as a position measuring tool. As the energy increases the scattering cross-section becomes more and more peaked in the forward direction. When the scattering angle is large, most of the energy is deposited in the first interaction. At low energies the photoelectric effect (one interaction) prevails. Because of these factors it appears that, notwithstanding the existence of multiple scattering, such scattering decreases the precision of the measurement, but does not substantially impair the viability of signal pulse shape analysis as a position-measuring tool.

SUMMARY OF INVENTION

It is therefore an object of this invention to provide an improved radiation detection system.

It is a further object of this invention to provide such an improved radiation detection system which uniquely defines the azimuthal and radial position of a radiation detection event with unsegmented electrodes.

It is a further object of this invention to provide such an improved radiation detection system in which either one or both of the detection diode electrodes may be segmented.

It is a further object of this invention to provide such an improved radiation detection system in which the length of every path between the inner and outer electrodes or at least each such path in each asymmetric sector of the detector diode is different.

It is a further object of this invention to provide such an improved radiation detection system which is more reliable, simple and easier to make and use yet far exceeds the resolution obtainable with segmented electrodes.

The invention results from the realization that information on where the radiation impinges on the detector can be obtained more simply, more reliably and less expensively without segmented electrodes using an asymmetric radiation detection system whose inner and outer electrodes are shaped and positioned so that each path between them is a different length whereby the rise time of a pulse derived from a detected radiation event can uniquely define the azimuthal and radial position of the event.

This invention features an asymmetric radiation detector system including a semiconductor diode having an outer electrode at the outer periphery at the outer periphery of the diode and an inner electrode disposed in the diode at a position in which each shortest path between any point on the inner electrode and the outer electrode has a different length for generating a pulse rise time uniquely representative of the azimuthal and radial location of a radiation detection event occurring in the diode.

In a preferred embodiment the semiconductor diode may be germanium that may be N-type germanium. The outer electrode may be unsegmented and continuous; the inner electrode may be hollow, and it may be unsegmented and continuous. The inner electrode may be annular in cross-section; the outer electrode may be annular in cross-section. The longitudinal axes of the inner and outer electrodes may be generally parallel, they may be coaxial, they may be eccentric to one another. The outer electrode may be asymmetrical, the inner electrode may be asymmetrical, the inner and outer electrodes may be symmetrical and their axis of symmetry may be unaligned. There may be a pulse analyzing device responsive to the pulse rise time of a pulse for determining the azimuthal and radial portion of the radiation event generating that pulse. The pulse rise time analyzing device may include means for determining the pulse rise time representative of the length of the path of the detection event generated hole electron current propagating between the electrodes which defines the azimuthal position of that event in the diode. The pulse rise time analyzing device may also include means for determining the pulse rise times associated with each of the hole and electron charges generated by a detection event which define the radial position of that event in the diode.

The invention also features an asymmetric radiation detector system including a symmetrical semiconductor diode including an outer electrode correspondingly symmetrical at the outer periphery of the diode and a symmetrical inner electrode disposed in the diode. There is at least one segmentation for separating the diode into a number of asymmetrical sectors. Each shortest path between any point on the inner electrode and the portion of the outer electrode associated with that sector has a different length for generating a rise time uniquely representative of the azimuthal and radial location of a radiation detection event occurring in the diode.

In a preferred embodiment the semiconductor diode may be germanium and may be N-type germanium. The outer electrode may be unsegmented and continuous. The inner electrode may be hollow and it may be unsegmented and continuous. The inner electrode may be annular in cross-section as may be the outer electrode. The longitudinal axis of the inner and outer electrodes may be generally parallel. They may be coaxial or they may be eccentric to one another. The system may include a pulse rise time analyzing device responsive to the pulse rise time of a pulse for determining the azimuthal and radial position of the radiation event generating that pulse. The pulse rise time analyzing device may include means for determining the pulse rise time representative of the length of the path of the detection event generated hole electron current propagating between the electrodes which defines the azimuthal position of that event in the diode. The pulse rise time analyzing device may also include means for determining the pulse rise times associated with each of the hole and electron charges generated by a detection event which define the radial position of that event in the diode.

DISCLOSURE OF PREFERRED EMBODIMENT

Other objects, features and advantages will occur to those skilled in the art from the following description of a preferred embodiment and the accompanying drawings, in which.

Figure 19:
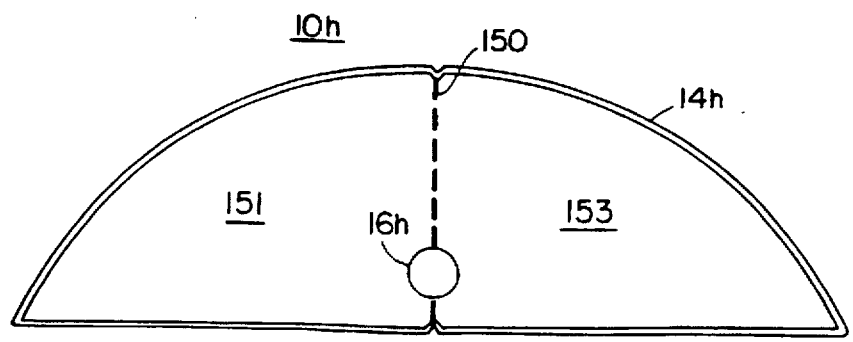
FIG. 19 is a view similar to FIGS. 15–18 in which both the inner and outer electrode are symmetrical and a segmentation is used to divide it into two asymmetrical sectors in accordance with this invention.
Figure 20:
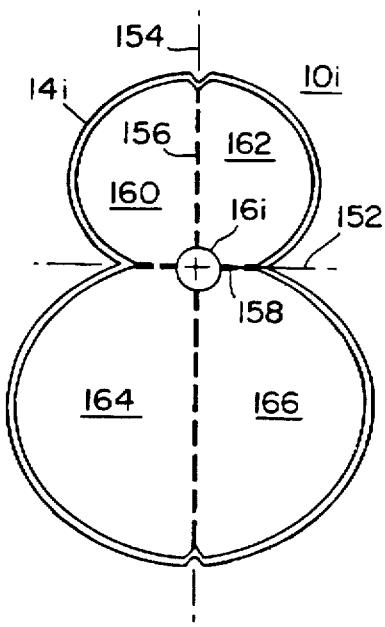
Figure 21:
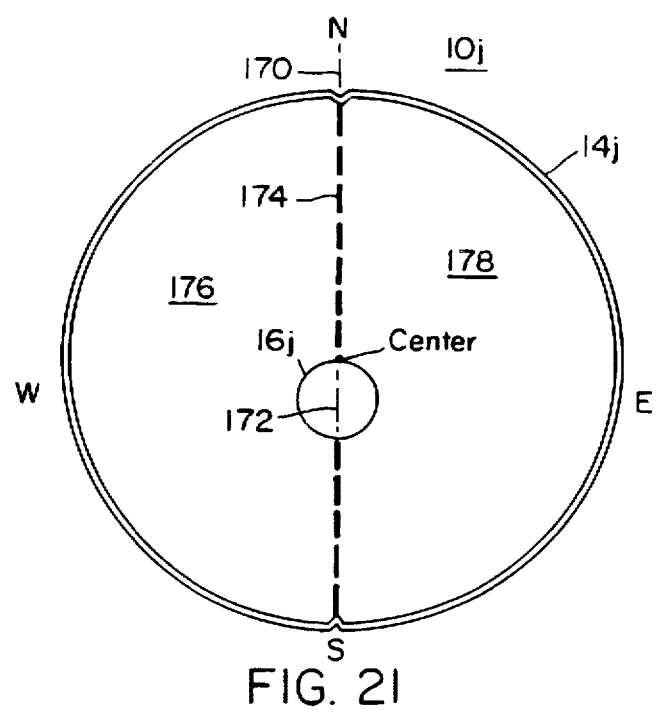

FIG. 20 is a view similar to FIG. 19 in which there are two axes of symmetries and two segmentations are used to divide the diode into four asymmetric sectors; and FIG. 21 is a view similar to FIGS. 19 and 20 in which the inner and outer electrodes are symmetrical and their axes of symmetries are aligned and segmentation on the inner or outer contact is used to divide the diode into two asymmetrical sectors.

Figure 1:
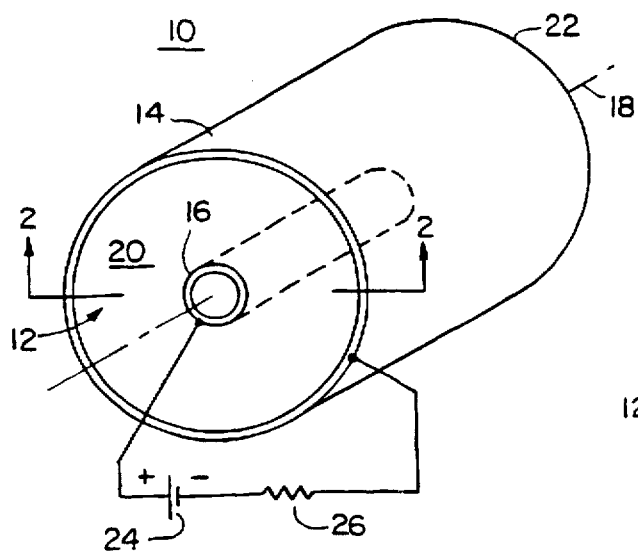
FIG. 1 is a schematic three-dimensional diagram of a prior art radiation detector.
Figure 2:
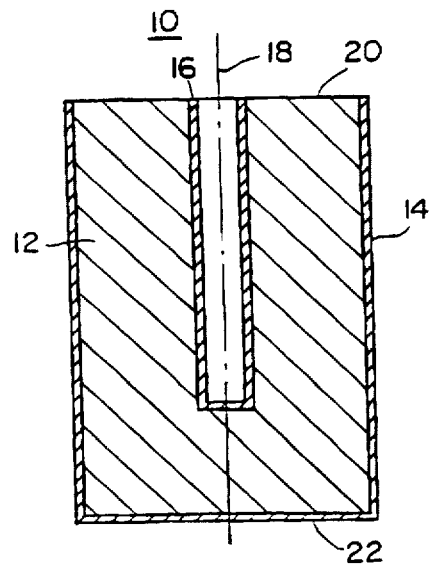
FIG. 2 is a cross-sectional view taken along line 2—2 of FIG. 1.

There is shown in FIG. 1 a prior art radiation detector 10 formed from a cylindrical N-type germanium crystal 12 encased in a cylindrical outer electrode 14 having a centrally located hollow inner electrode 16 which extends axially part of the way through germanium crystal 12 coaxially with longitudinal axis 18 from the face 20 part way to the base 22, FIG. 2. The diode thus formed is back biased by means of battery 24 whose positive terminal is connected to inner electrode 16 and whose negative terminal is connected through load resistor 26 to outer electrode 14.

Figure 3:
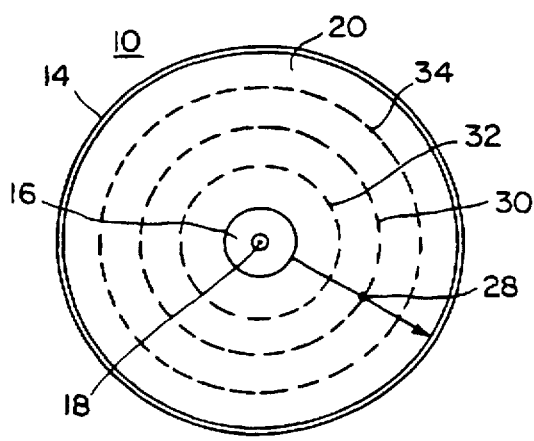
FIG. 3 is an enlarged schematic view of the face of the detector in FIGS. 1 and 2 illustrating the inability to determine azimuthal position of a detection event without segmented electrodes.
Figure 4:
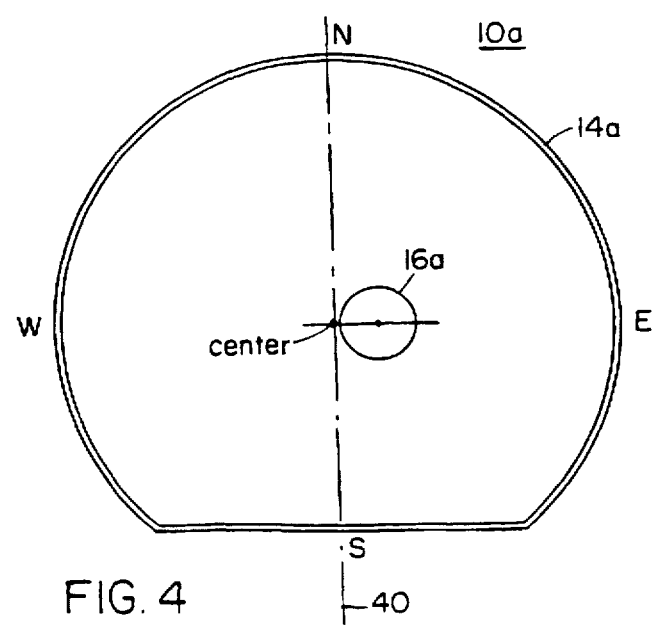
FIG. 4 is a schematic diagrammatic plan view of an asymmetric radiation detector according to this invention in which both the outer and inner electrodes are symmetrical but their axes of symmetry are unaligned.

As can be seen in FIG. 3, where face 20 has been shown schematically and enlarged and electrode 16 has been shown solid instead of hollow, these prior art detectors are capable of determining where radially a detection event has occurred. For example, a detection event 28 which occurred at point 28 can be distinguished from one occurring at radius 30, 34 at the inner or outer electrodes 16 and 14. However, no information on the azimuthal position of event 28 can be obtained in such prior art devices unless the inner or outer electrodes are segmented. For example, if outer electrode 14 were divided into two segments, then event 28 could be determined to have occurred in one half or the other of detector 10. If there were four segments then a determination could be made as to in which of the four quarters it occurred azimuthally. If there were thirty-two sectors a determination could be made as to in which 32nd of the detector the event occurred. And of course the construction and testing of these segments, as well as all the additional complex circuitry associated with them, adds to the time, labor and cost required to make such devices.

In accordance with this invention a detector can be made to provide both radial and azimuthal position without segmentation of the electrodes by defining the shape and position of the two electrodes so that the shortest path between any point on one electrode and the other electrode has a different length so that a pulse is generated whose rise time uniquely represents the azimuthal and radial location of a radiation event occurring within the diode. For example, detector 10a according to this invention may have a symmetrical outer electrode 14a and symmetrical inner electrode 16a, but the axis of symmetry 40 of outer electrode 14a aligns with no axis of symmetry of the circular inner electrode 16a. Circular inner electrode 16a has an axis of symmetry defined by each and every of its diameters. Because of this construction, a path between any point of inner electrode 16a directly to outer electrode 14a will be different in length than any other such path. As will be shown, this enables pulse rise times to uniquely define azimuthal and radial positions.

Figure 5:
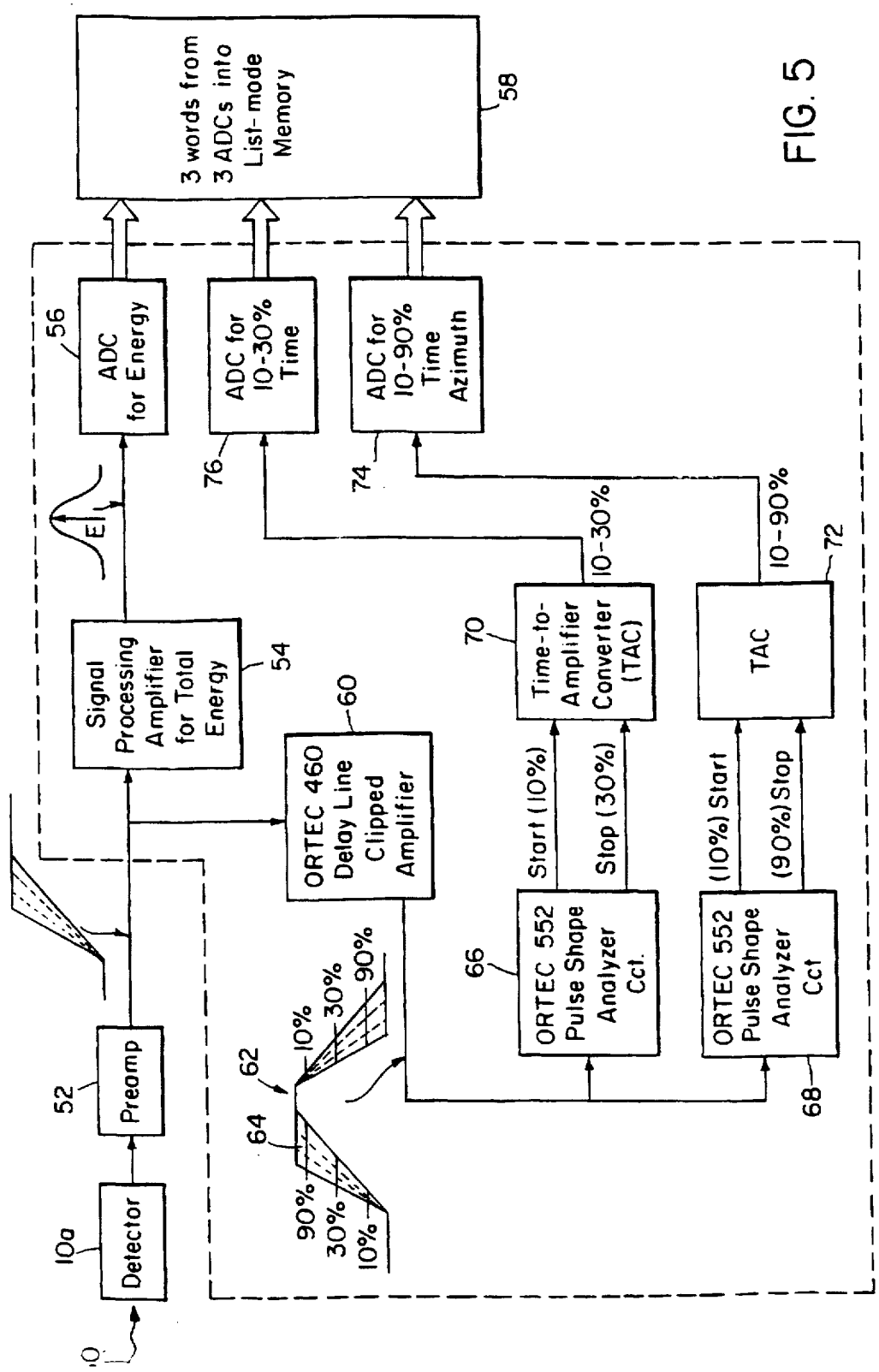
FIG. 5 is a schematic block diagram of an asymmetric radiation detector system according to this invention which determines the energy, azimuthal and radial position of a detection event detected by the detector.

The detector according to this invention, such as detector 10a, FIG. 5, receives gamma ray radiation 50, for example, and delivers an analog signal representative thereof to preamplifier 52 which in turn delivers that signal to a signal processing amplifier 54 that provides a signal representing the total energy E to analog to digital converter 56 for further delivery to list mode memory 58. The same signal is delivered to delay line clipped amplifier 60 such as in an EG&G ORTEC 460 made by EG&G ORTEC Corporation of Oak Ridge, Tenn. There the input signal from preamp 52 is delayed and subtracted from the original undelayed signals, and it provides an output pulse 62 which displays the rise times 64 of the input pulse from preamplifier 52. Pulse 62 is provided to two pulse shape analyzers 66 and 68 which may be implemented with an EG&G ORTEC 552 circuit from EG&G ORTEC, Inc. of Oak Ridge, Tenn. The pulse shape analyzers work on the well known principle of constant fraction timing on the trailing edges of the pulses supplied by the MOD 460 amplifiers. This principle is explained in the instruction manual of the 552. Pulse shape analyzer circuit 66 samples the rise times at 10% and 30% and submits them to time to amplitude converter 70 which provides an amplitude representative of the rise time between 10% and 30%. Pulse shape analyzer circuit 68 performs in the same way but instead samples 10% and 90% points which are delivered to time to amplitude converter 72 that provides an output whose amplitude represents the rise time from 10% to 90%. The 10–90% rise time is converted by analog to digital converter 74 to a digital signal for indicating the azimuthal position of the detected event. The output from time to amplitude converter 74 representing the 10–30% rise time is provided to analog to digital converter 76 which provides a digital output representing the 10–30% rise time. The 10–30% rise time from ADC 76 and the 10–90% rise time from ADC 74 are used to determine the radial position of the detection event. Thus list mode memory stores three words from the three ADCs 56, 74 and 76 which represent the energy in the pulse and the radial and azimuthal position of the pulse representative of a radiation detection event sensed by detector 10a. More sophisticated electronic processing can be implemented to employ the full information inherent in the pulse shape.

Figure 6:
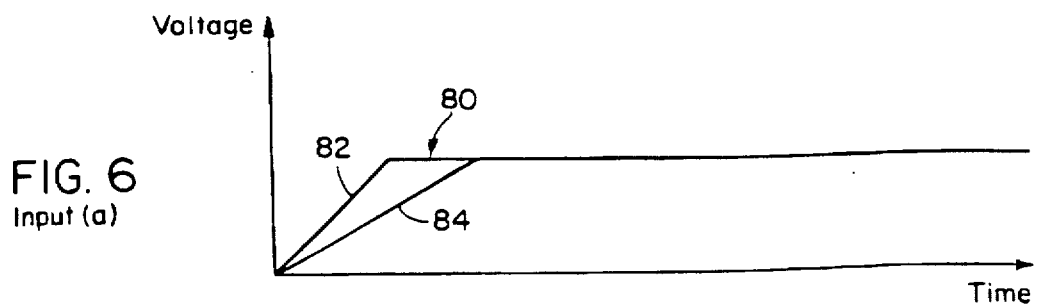
FIG. 6 illustrates input pulses which are input to the system.
Figure 7:
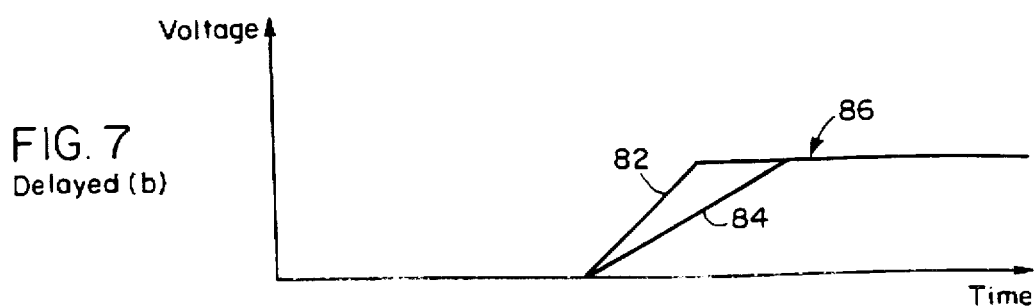
FIG. 7 is a view of the pulse of FIG. 6 after it has been delayed.
Figure 8:
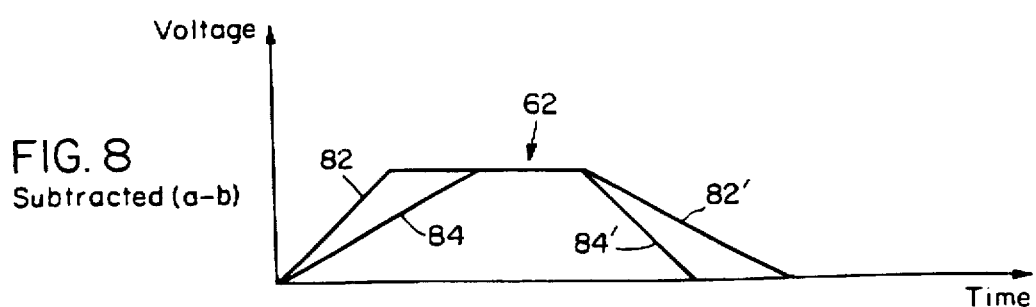
FIG. 8 illustrates the result of subtracting the delayed pulse in FIG. 7 from the input pulse in FIG. 6.
Figure 9:
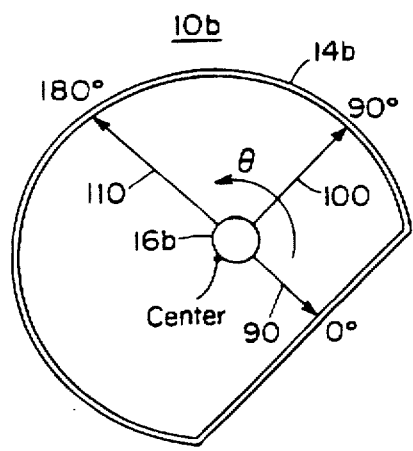
FIG. 9 is a view of a detector face similar to FIG. 4 showing various azimuthal angles θ from 0°–180°.

The generation of pulse 62 by delay line clipped amplifier 60, FIG. 5, is shown in FIGS. 6, 7 and 8, where the input to delay line clipped amplifier 60 appears as pulse 80 having a range of rise times 82–84. Pulse 80 delayed, i.e., pulse 86, having the same range of rise times 82–84, FIG. 6, is developed in delay line clipped amplifier 60 as shown in FIG. 7. Delayed input pulse 86 having the same range of rise times 82–84 is developed in delay line clipped amplifier 60 and subtracted from the undelayed input signal 80 to produce output pulse 62, FIG. 8, having the same rise time range 82–84 and the mirror image fall time 82'–84'.

The use of the rise times to obtain azimuthal position is demonstrated with respect to FIGS. 9–12. For example, the detector 10b, FIG. 9, having outer electrode 14b and inner electrode 16b, will produce a pulse whose rise time depends upon the length of the path travelled between the inner and outer electrode by the charge generated by the radiation event. For example, an event occurring along the zero radius 90, FIG. 9, will typically produce a pulse 92, FIG. 10, that has a range of rise times from a minimum 94 to a maximum 96. Thus a rise time detected by virtue of the samples at the 10% and 90% points, such as rise time 98, falls within that range and defines a position along the zero radius. For an event that occurred along the 90° radius 100, FIG. 9, a pulse such as pulse 102, FIG. 11, may be generated which has a minimum 104 and maximum 105 range of rise times so that a rise time 108 determined by samples taken at the 10% and 90% points falls within that range and indicates an azimuthal position along the 90° radius. An event occurring along the 180° radius 110, FIG. 9, will produce a pulse 112, FIG. 12, having minimum and maximum rise times 114, 116 so that a pulse having a rise time 118 defined by the sample points taken at 10% and 90% represents a pulse occurring azimuthally somewhere along 180° radius 110.

Figure 13:
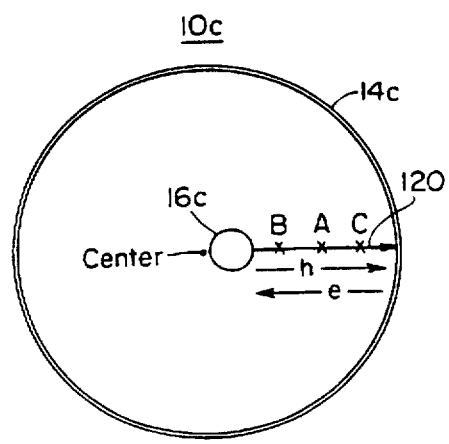
FIG. 13 is view of a radiation detector according to this invention similar to that shown in FIGS. 4 and 9 illustrating the detection of events at three different radial distances A, B and C between the inner and outer electrode.
Figure 10:
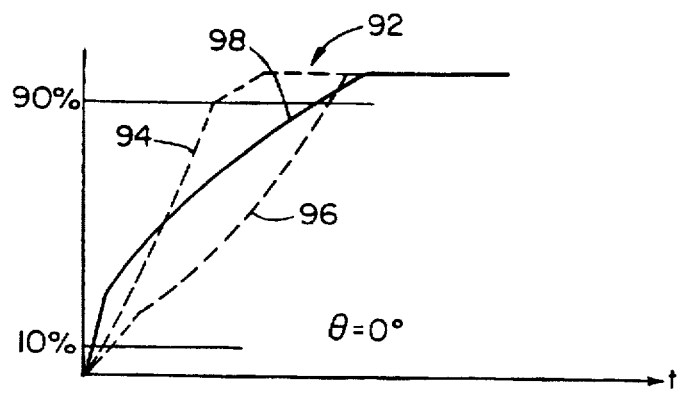
FIG. 10 illustrates a pulse rise time which occurs in the azimuthal position along the 0° radius.
Figure 11:
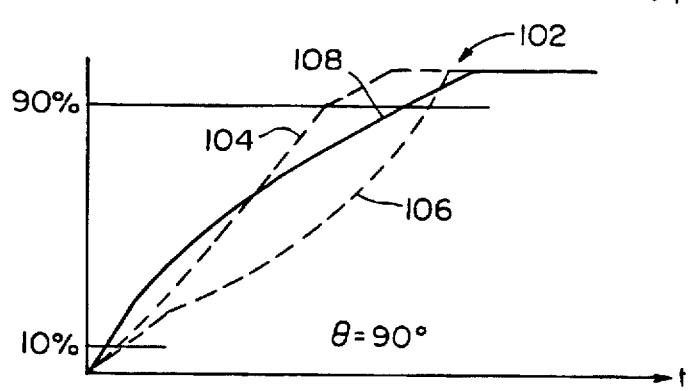
FIG. 11 is a view similar to FIG. 10 where a pulse rise time indicates an azimuthal position along the 90° radius.
Figure 12:
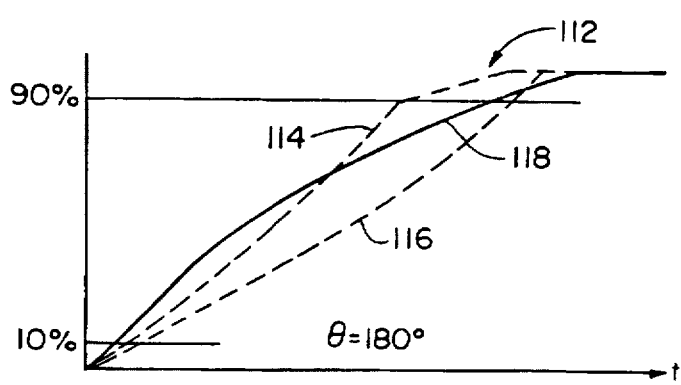
FIG. 12 is a view similar to FIGS. 10 and 11 where the pulse rise time indicates an azimuthal position along the 180° radius.

The radial position or the position of the event along the radius can be determined by comparing the 30% and 90% points. For example, assume detector 10c, FIG. 13, has detected events A, B and C occurring along a radius 120, where event A is halfway between electrode 16c and electrode 14c, event C occurs closer to the outer electrode 14c, and event B occurs closer to the inner electrode 16c. Holes generated by an event travel outwardly to electrode 14c which is biased negatively, and electrons flow inwardly toward electrode 16c which is biased positively.

Figure 14:
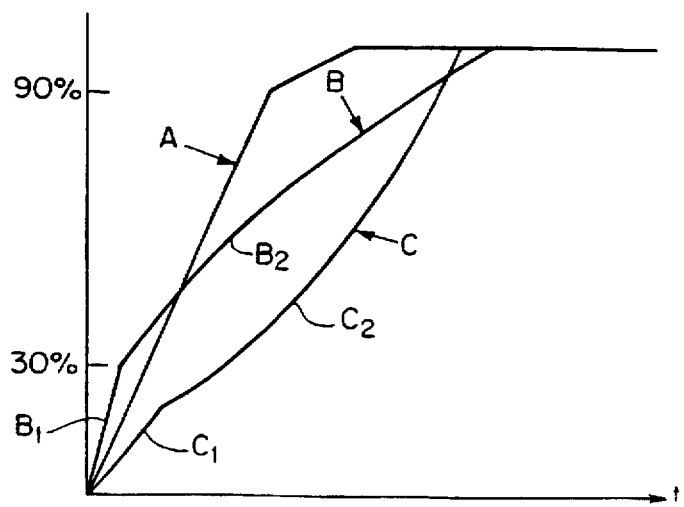
FIG. 14 illustrates the waveform of pulses whose rise times vary in accordance with the radial position of the occurrence of the events A, B and C.

Upon the occurrence of an event A, the holes generated there need travel only half the distance between electrodes 16c and 14c, from A to outer electrode 14c. Likewise, the electrons need only travel half the distance, from event point A to inner electrode 16c. Thus the electrons and holes will be collected and form a current in one half the full travel time and the rise time is the shortest possible reflected as rise time A in FIG. 14. In comparison, an event occurring at B closer to inner electrode 16c would provide a fast rise time $B_1$ while the electrons make the short path from B to inner electrode 16c but then has a much slower rise time $B_2$ while the holes travel the longer distance from event point B to outer electrode 14c, providing a composite rise time B. Conversely, an event occurring at point C will enable the holes to be collected quickly, producing fast rise time $C_1$ but then produce a slower rise time $C_2$ while the electrons travel the farther distance from event point C to inner electrode 16c to produce the composite rise time C. Please note that the non-linear rise times and the differences in shape between pulses B and C are due to the coaxial geometry of the detector.

Figure 15:
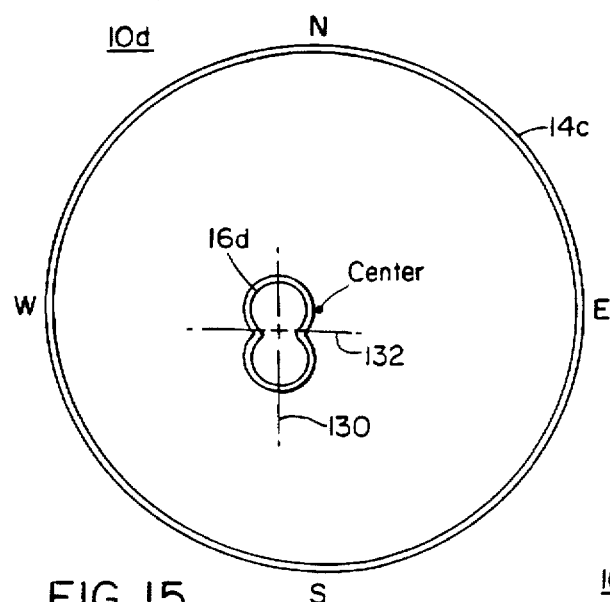
FIG. 15 is a schematic plan view of the face of a radial detector according to this invention having another geometry in which both the inner and outer electrodes are symmetrical but whose axes of symmetry are unaligned.
Figure 16:
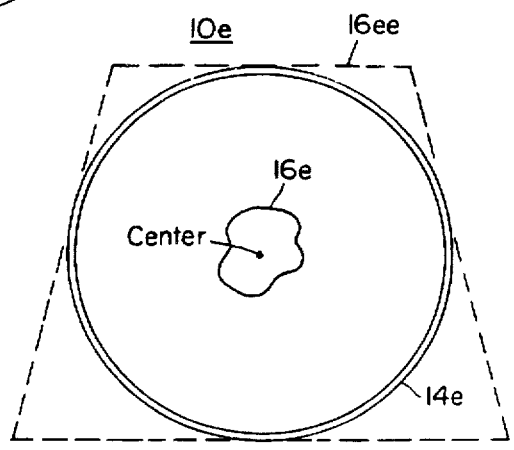
FIG. 16 is a view similar to FIG. 15 in which the inner electrode is asymmetrical and the outer electrode is symmetrical.
Figure 17:
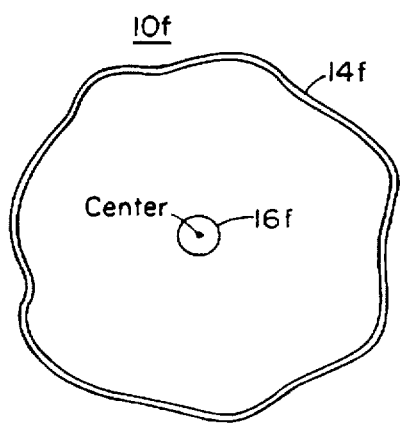
FIG. 17 is a view similar to FIGS. 15 and 16 in which the outer electrode is asymmetrical and the inner electrode is symmetrical.
Figure 18:
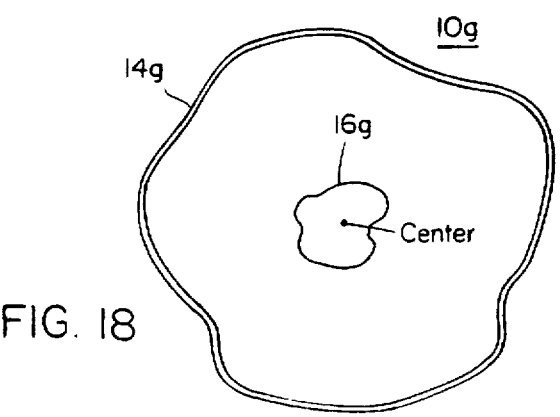
FIG. 18 is a view similar to FIGS. 15–17 in which the inner and outer electrodes are asymmetrical.

A variety of combinations of symmetrical inner and outer electrodes with their axis of symmetry unaligned and various combinations of asymmetrical and symmetrical inner and outer electrodes may be employed to obtain the desired construction which provides the shortest path between any point on the inner electrode and the outer electrode such that each such path has a different length. For example, in FIG. 15 detector 10d has a circular and thus symmetrical outer electrode 14c and a symmetrical inner electrode 16d, but neither of the axes of symmetry 130, 132, of inner electrode 16d is aligned with any axis of symmetry of outer electrode 14c. In FIG. 16 inner electrode 16e is asymmetrical but outer electrodes 14e and 14ee are circles and are symmetrical. The outer electrode could also be a symmetrical trapezoid 16ee, shown in phantom. In FIG. 17, inner electrode 16f is a symmetrical circular shape while outer electrode 14f is an irregular asymmetrical shape. In FIG. 18 both the inner 16g and outer 14g electrodes are asymmetrical. FIG. 19 illustrates a detector 10h which has a symmetrical outer electrode 14h and inner electrode 16h but has been segmented in accordance with this invention by an insulating, isolating element 150 which divides the diode and outer electrode 14h into two sectors 151, 153, each of which is asymmetric and in each of which the shortest path between any point on the inner electrode and the outer electrode has a different length. A similar adaptation is made in accordance with this invention in FIG. 20, where inner electrode 16i is symmetrical and outer electrode 14i is symmetrical about two axes 152 and 154 so that two electrically isolating segments, barriers or elements 156 and 158 are provided to provide four asymmetrical sectors 160, 162, 164 and 166, in each of which the shortest path between any point on the inner electrode and the outer electrode has a different length. In FIG. 21, detector 10j has a circular outer electrode 14j and a circular inner electrode 16j that have mutual aligned symmetrical axes 170, 172 so that segmentation 174 such as, for example, an electrically isolating barrier element is provided to divide the area into two asymmetric sectors 176 and 178 to support the determination of azimuthal and radial positions in accordance with this invention. Inner electrodes 16a–j may be solid or hollow or tubular.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An asymmetric radiation detector system comprising:
    a semiconductor diode including an outer electrode at the outer periphery of said diode; and
    an inner electrode disposed in said diode at a position in which each shortest path between any point on the inner electrode and the outer electrode has a different length for generating a pulse rise time uniquely representative of the azimuthal and radial location of a radiation detection event occurring in said diode.

2. The asymmetric radiation detector system of claim 1 in which said semiconductor diode is germanium.

3. The asymmetric radiation detector system of claim 1 in which said semiconductor diode is either N type or P type germanium.

4. The asymmetric radiation detector system of claim 1 in which said outer electrode is unsegmented and continuous.

5. The asymmetric radiation detector system of claim 1 in which said inner electrode is hollow.

6. The asymmetric radiation detector system of claim 5 in which said inner electrode is unsegmented and continuous.

7. The asymmetric radiation detector system of claim 5 in which said inner electrode is annular in cross-section.

8. The asymmetric radiation detector system of claim 1 in which said outer electrode is annular in cross-section.

9. The asymmetric radiation detector system of claim 1 in which the longitudinal axes of said inner and outer electrodes are generally parallel.

10. The asymmetric radiation detector system of claim 9 in which said inner and outer electrodes are coaxial.

11. The asymmetric radiation detector system of claim 8 in which said inner and outer electrodes are eccentric to one another.

12. The asymmetric radiation detector system of claim 1 in which said outer electrode is asymmetrical.

13. The asymmetric radiation detector system of claim 1 in which said inner electrode is asymmetrical.

14. The asymmetric radiation detector system of claim 1 in which said inner and outer electrodes are symmetrical and their axes of symmetry are unaligned.

15. The asymmetric radiation detector system of claim 1 further including a pulse rise time analyzing device responsive to the pulse rise time of a pulse for determining the azimuthal and radial position of the radiation event generating that pulse.

16. The asymmetric radiation detector system of claim 15 in which said pulse rise time analyzing device includes means for determining the pulse rise time representative of the length of the path of the detection event generated hole-electron current between said electrodes which defines the azimuthal position of that event in the diode.

17. The asymmetric radiation detector system of claim 15 in which said pulse rise time analyzing device includes means for determining the pulse rise times associated with each of the hole and electron charges generated by a detection event which define the radial position of that event in the diode.

18. An asymmetric radiation detection system comprising:
    a symmetrical semiconductor diode including an outer electrode correspondingly symmetrical at the outer periphery of said diode;
    a symmetrical inner electrode disposed in said diode;
    at least one segmentation for separating said diode into a number of asymmetrical sectors, each shortest path between any point on the inner electrode and the outer electrode associated with that sector having a different length for generating a pulse rise time uniquely representative of the azimuthal and radial location of a radiation detection event occurring in said diode.

19. The asymmetric radiation detector system of claim 18 in which said semiconductor diode is germanium.

20. The asymmetric radiation detector system of claim 18 in which said semiconductor diode is either N type or P type germanium.

21. The asymmetric radiation detector system of claim 18 in which said outer electrode is unsegmented and continuous.

22. The asymmetric radiation detector system of claim 18 in which said inner electrode is hollow.

23. The asymmetric radiation detector system of claim 18 in which said inner electrode is unsegmented and continuous.

24. The asymmetric radiation detector system of claim 18 in which said inner electrode is annular in cross-section.

25. The asymmetric radiation detector system of claim 18 in which said outer electrode is annular in cross-section.

26. The asymmetric radiation detector system of claim 18 in which the longitudinal axes of said inner and outer electrodes are generally parallel.

27. The asymmetric radiation detector system of claim 26 in which said inner and outer electrodes are coaxial.

28. The asymmetric radiation detector system of claim 18 in which said inner and outer electrodes are eccentric to one another.

29. The asymmetric radiation detector system of claim 18 further including a pulse rise time analyzing device responsive to the pulse rise time of a pulse for determining the azimuthal and radial position of the radiation event generating that pulse.

30. The asymmetric radiation detector system of claim 29 in which said pulse rise time analyzing device includes means for determining the pulse rise time representative of the length of the path of the detection event generated hole-electron current between said electrodes which defines the azimuthal position of that event in the diode.

31. The asymmetric radiation detector system of claim 29 in which said pulse rise time analyzing device includes means for determining the pulse rise times associated with each of the hole and electron charges generated by a detection event which define the radial position of that event in the diode.

* * * * *